United States Patent [19]

Sugisawa et al.

[11] Patent Number: 4,786,516

[45] Date of Patent: Nov. 22, 1988

[54] METHOD OF DRYING MEAT

[75] Inventors: Ko Sugisawa; Yasushi Matsumura, both of Nara; Kazumitsu Taga, Nevagawa; Ryuichi Hattori, Kyoto, all of Japan

[73] Assignee: House Food Industrial Company Limited, Japan

[21] Appl. No.: 16,246

[22] Filed: Feb. 19, 1987

Related U.S. Application Data

[63] Continuation of Ser. No. 767,149, Aug. 19, 1985, abandoned, which is a continuation of Ser. No. 544,356, Oct. 21, 1983, abandoned.

[30] Foreign Application Priority Data

Jan. 9, 1981 [JP] Japan ............................... 136089/81

[51] Int. Cl.$^4$ .......................... A23L 3/38; A23L 1/31; F26B 5/06; F26B 5/10
[52] U.S. Cl. ................................... 426/385; 426/438; 426/444; 426/465; 426/524; 34/5
[58] Field of Search .............. 426/384, 385, 438, 810, 426/644, 641, 645, 646, 647, 465, 524; 34/5

[56] References Cited

U.S. PATENT DOCUMENTS

| | | | |
|---|---|---|---|
| 2,278,472 | 4/1942 | Musher | 426/438 |
| 3,150,985 | 4/1964 | Buscemi et al. | 426/438 |
| 3,597,228 | 8/1971 | Jeppson et al. | 426/271 |
| 3,649,290 | 3/1972 | Angold | 426/438 |
| 3,966,983 | 6/1976 | Dexter et al. | 426/438 |
| 4,342,788 | 8/1982 | Clatfelter | 426/438 |

FOREIGN PATENT DOCUMENTS 58-40033 3/1983 Japan .

Primary Examiner—Marianne Cintins
Attorney, Agent, or Firm—David G. Rosenbaum; Harry M. Weiss

[57] ABSTRACT

A method of drying raw meat is disclosed wherein the meat is predried by a deep frying treatment under a vacuum and is then vacuum freeze-dried.

8 Claims, No Drawings

METHOD OF DRYING MEAT

This application is a continuation of application Ser. No. 767,149, filed 8,19,85, now abandoned, which is a continuation application Ser. No. 544,356, filed 10,21,83, now abandoned.

BACKGROUND OF THE INVENTION

1. Field of the Invention

This invention relates to a novel method of drying meat which comprises deep-frying the meat under reduced pressure and then vacuum freeze-drying the deep-fried meat and, if desired, preheating the meat prior to the above deep frying treatment.

2. Brief Description of the Prior Art

In the past, several techniques for drying foodstuff have been studied and developed. The object of these methods is to dry the foodstuff without impairing its inherent characteristics and to make it possible to rehydrate the dried foodstuff into an approximately similar state to that of the foodstuff before drying. At present, it is generally accepted that among the various drying techniques, the freeze drying technique best attains the above objects. The freeze drying technique is used to dry many foodstuff and, of course, to dry meat.

The meat is freeze-dried in such a way that almost none of its cells are broken and the meat does not shrink, so that the appearance of the meat after drying is substantially the same as before drying. In the freeze-dried meat, however, the flavor-bearing materials in the meat, e.g., the meat juices and the like, are present in the form of powder, and when the meat is rehydrated, the powdered flavor-bearing materials are dissolved in water or a seasoned broth which penetrates into the dried meat and are extracted from the meat. As a result, the rehydrated meat loses flavor. Moreover, the state of the rehydrated meat differs from that of the meat before drying, and the rehydrated meat is obtained by merely allowing the water or seasoned broth to impregnate in the freeze-dried meat. Thus, the taste and texture of the meat which has been rehydrated and then cooked is different from the taste and texture of fresh (undried) meat which has been cooked.

As mentioned above, the dried meat obtained according to the conventional freeze drying technique may be satisfactory in appearance. However, when rehydrated and cooked, its flavor and texture do not compare satisfactorily with undried meat which has been cooked.

For example, U.S. Pat. No. 3,984,577 discloses a method of producing a compacted, freeze-vacuum-dehydrated food selected from the group consisting of vegetables and meats which upon rehydration with water produces a rehydrated food which is substantially indistinguishable from the food prior to compaction and freeze-vacuum-dehydration thereof. This method comprises compacting said food while frozen in particulate form and simultaneously freeze-vacuum-dehydrating said food to a moisture content below about 4.0 % by weight, said compacting being carried out by applying mechanical pressures of at least about 20 p.s.i. and sufficient to provide a freeze-vacuum-dehydrated food having a bulk density of from about 0.5 to about 1.2 g/cc. However, the drying method in the above U.S. Patent is merely a vacuum freeze-drying. Accordingly, the dried meat obtained according to the method of the above patent has similar defects to the conventional freeze-dried meat. Namely, upon rehydration with water, the powdered flavor-bearing materials, e.g., the meat juices, in the dried meat are dissolved in water which penetrates into the meat and are extracted from the meat. Thus, the rehydrated meat loses flavor.

SUMMARY OF THE INVENTION

This invention obviates the above defects of the meat obtained according to the conventional vacuum freeze-drying technique. The object of this invention is to provide a method for drying meat to obtain dried meat which after rehydration and cooking is substantially identical to cooked fresh meat in flavor and texture and which is not made unpalatable by breaking of the meat tissue under a high temperature and pressure treatment, such as a retort treatment. The gist of this invention which attains the above object resides in a method for drying meat which comprises predrying the meat by deep-frying it under reduced pressure and then freeze-drying the predried meat under vacuum.

DESCRIPTION OF THE INVENTION INCLUDING THE PREFERRED EMBODIMENTS

The typical meats to which this invention can be applied are those of such domesticated animals as the cow pig, sheep, goat, horse, rabbit, etc. and those of such wild animals as the kangaroo, deer, wild boar, etc. as well as those of the chicken and whale. They may be used in any of various cut shapes or in the form of processed meat such as minced meat for use as a raw material for ham, sausage, hamburger and the like.

According to this invention, the above meat is predried by deep-frying it under reduced pressure and preferably the meat is preheated prior to the predrying treatment. The preheating treatment is a preferable means for realizing evaporation of water from the meat during its predrying in the succeeding step, i.e., the deep frying step under reduced pressure. If the temperature throughout the meat is made uniform prior to deep-frying under vacuum, it becomes possible to cause the uniform evaporation of water from the meat during the deep frying treatment under reduced pressure. The preheating in this invention, therefore, functions as a temperature conditioning treatment in order to make the temperature throughout the meat approximately uniform.

In order to attain the effect of the above temperature conditioning treatment, the preheating is preferably carried out at a temperature of about 30° to 90° C. Moreover, so that the preheating will cause approximately uniform thermal modification to some extent, it is preferable to carry out the preheating at a temperature of about 50° to 85° C. By this heat induced modification, the flavor-bearing materials, e.g., the meat juice component, in the meat can be solidified and thus the flavor of the meat can be locked in. This is an important feature of this invention which is not observed whatsoever in the case of the conventional freeze drying technique. The preheating may be executed by an appropriate means such as a hot-air treatment, a steaming treatment, a constant temperature-humidity treatment or the like. The succeeding predrying step is a deep frying step and for this a preheating step of immersing in heated oil is preferable.

The preheated meat is predried by the succeeding deep frying treatment under reduced pressure. Effects of the deep frying treatment under reduced pressure are mainly (1) that an appropriate dehydration and thermal modification occur relatively rapidly throughout the meat at a low temperature and in a short time, whereby the flavor-bearing materials of the meat are solidified and locked in; (2) that an appropriate amount of oils and fats are forced to penetrate the meat tissue; (3) that the growth of ice crystals in the succeeding freezing step is prevented; and (4) that the drying time at the freeze drying operation is shortened.

The above effects are important features of this invention which were not at all found in the conventional freeze drying technique.

In order to efficiently realize the effects of the predrying treatment according to the deep frying treatment under reduced pressure, it is preferable to use a high degree of vacuum and to reduce the pressure to the desired degree of vacuum rapidly, and to use a low oil temperature. Although the concrete conditions vary somewhat depending on a kind, size, amount and the like of the meat to be treated, the pressure is generally not more than about 100 torr and preferably not more than about 50 torr. The time for attaining the desired degree of vacuum is not more than about 5 minutes and preferably not more than about 2 minutes. The oil temperature is preferably not more than about 100° C. and more preferably about 50° to 85° C. In the case that the preheating is carried out by the exposure to oil before the predrying treatment, it is preferable from the point of workability to carry out the predrying at the approximately same oil temperature as that of the preheating.

There are various methods for carrying out the predrying by deep-frying the meat under reduced pressure. For example, there are a method comprising immersing the meat in oil in an oil tank and then rapidly reducing the pressure throughout the oil tank, and a method comprising reducing the pressure throughout the oil tank beforehand and then immersing the meat in oil, the meat being supplied to the oil tank before or after the pressure reduction. The predrying due to the deep frying under reduced pressure according to this invention can be carried out by either method. However, in the case that the preheating is carried out by immersing the meat in the heated oil prior to the predrying, the former method is preferred in view of the advantages that the preheating and the predrying can be carried out in the same vessel and that the temperature of the meat after preheating does not vary.

The water content of the meat which is obtained by the predrying is generally about 35 to 65% and preferably about 45 to 55%, based on the weight of the meat exclusive of the fat portion. If the water content of the meat is not lowered to this level by the predrying, the effects of the predrying as mentioned above may not be substantially produced and thus, there may be little difference-in quality between the finally obtained dried meat product in this invention and the meat product obtained by the conventional freeze-drying technique. On the other hand, in the case that the water content of the meat is excessively lowered by the predrying, hardening and shriveling of the meat tissue starts to become remarkable because of the evaporation of a large amount of water, and this is apt to damage the appearance of the meat and to lower its efficiency of rehydration with water or seasoned broth.

The meat predried by the deep frying treatment under reduced pressure is finally processed into the dried meat product by the vacuum freeze-drying treatment. The vacuum freeze-drying treatment may be carried out by a conventional procedure, and it is preferable that the final freezing temperature be not more than about −10° C. and the cooling rate be, for example, such that the cooling time from 25° C. to −30° C. is about 30 to 120 minutes.

The heating means in the vacuum freeze-drying step may be either by heat conduction, radiant heating, internal heating or the like, or a combination thereof. The freeze drying should be preferably carried out as rapidly as possible in such a way that the temperature of the dried portion of the meat is not over about 70° C. and the ice crystals in the undried portion do not melt.

Below are described comparative tests demonstrating the effect of the method of this invention, and examples of this invention. These are presented for explanatory purposes and are not to be considered as limiting the invention in any way.

COMPARATIVE TEST 1

(1) This Invention A

Beef round sliced to a thickness of 3 to 5 mm was predried by deep-frying it in salad oil at 50° C. under a reduced pressure of 5 torr for 5 minutes. Then, the meat was prefrozen to −35° C. at the rate of −1° C./min. and thereafter was vacuum freeze-dried with radiant heat of 60° C. under a reduced pressure of 0.5 torr for 3 hours to obtain dried meat having a water content of about 3%. Then, the resulting dried meat was immersed in water at room temperature until the dried meat was sufficiently rehydrated, and thereafter the rehydrated meat was put in a hot butter-greased frying pan and was cooked at weak caloric force for about one minute and 30 seconds.

(2) Comparative Example 1

Beef round sliced to a thickness of 3 to 5 mm was cooked in a frying pan under the same conditions as in "This Invention A".

(3) Comparative Example 2 Beef round sliced to a thickness of 3 to 5 mm was prefrozen under the same conditions as in "This Invention A" and thereafter it was vacuum freeze-dried for 8 hours under the same conditions as in "This Invention A" to obtain dried meat having a water content of about 3%. Then, the dried meat was rehydrated and cooked under the same conditions as in "This Invention A".

Table 1 shows the results of the above comparative tests

TABLE I

|  | This Invention A | Comparative Example 1 | Comparative Example 2 |
|---|---|---|---|
| State of dried meat | Light brown. Held shape well. | — | Slightly reddish light brown. Disintegrated easily. |
| Rehydration time | 30 minutes | — | 20 minutes. |
| State of Immersion water and rehydrated meat | Immersion water became slightly reddish but almost no charge. Color of rehydrated meat was substantially the same as that of | — | Immersion water became reddish with time. Rehydrated meat lost redness with time. |

TABLE I-continued

| | This Invention A | Comparative Example 1 | Comparative Example 2 |
|---|---|---|---|
| State of cooked meat | raw meat. Almost exactly the same as cooked raw meat. Cooked a little more quickly than raw meat. | Redness observed in the center portion. | Shrank easily; difficult to cook. Only the surface burned easily. |
| Flavor and texture of cooked meat | Hardly any different from cooked raw meat. Juicy. | Appetizing. Juicy. | Unpalatable and soft. Lacking flavor and texture. Not juicy. Left a bad aftertaste. |

From the above Table I, the following observations can be made. Comparing the states of the dried beef in Table I, it is clear that the dried beef obtained by "This Invention A" is less apt to disintegrate than the dried beef which was obtained by the conventional freeze-drying technique (Comparative Example 2) and thus that reduction of product yield by breaking and the like is effectively prevented in the case of this invention. The rehydration time in "This Invention A" is slightly longer than that of "Comparative Example 2". In "Comparative Example 2", the flavor-bearing materials contained in the dried beef are extracted from the beef and the immersion water become remarkably reddish, and on the other hand, in "This Invention A" such phenomena are almost non-existent and the dried beef can be rehydrated in such a state that the flavor-bearing materials are retained. These differences are remarkably reflected in the state of the beef during cooking and the flavor and texture of the cooked beef. Namely, in "Comparative Example 2", the beef easily shrinks during cooking and burns only on the surface thereof. This means that the meat rehydrates faster but is apt to release water after rehydration and during cooking. As a result, the taste and texture of the cooked beef becomes unpalatable and it is not juicy. Moreover, the poor flavor of the cooked beef is made even worse by the fact that the flavor-bearing materials of the beef are eluded during rehydration.

On the other hand, the rehydration in "This Invention A" is slower than that in "Comparative Example 2" but the state of the beef during cooking is almost the same as that of raw beef during cooking. Thus, the rehydrated and cooked beef is almost no different in taste, texture and juiciness from cooked raw beef. In addition, in "This Invention A", an appropriate amount of oils and fats is present in the beef because of the deep frying treatment under reduced pressure and thus the taste and texture of the cooked beef are mellowed by the pressure of the oils and fats. Moreover, the flavor of the rehydrated and cooked beef is almost the same as that of the cooked raw beef since almost no flavor-bearing material is eluted during rehydration. In addition, "This Invention A" produces the excellent effect that the freeze-drying time of the beef is only about one third as long as "Comparative Example 2".

Comparative Test 2

(1) This Invention B

The beef round which was rehydrated in the above "This Invention A" was, without being cooked, placed in a retort pouch together with a curry roux and thereafter was subjected to a retort treatment at 121° C. for 8 minutes. 30 g of rehydrated beef round and 150 g of the curry roux were used in this experiment, and also in the following comparative examples.

(2) Comparative Example 3

Raw beef round was placed together with a curry roux into a retort pouch and thereafter was subjected to a retort treatment under the same condition as in the above "This Invention B".

(3) Comparative Example 4

The beef round, which was cooked in the above "Comparative Example 1", was placed together with a curry roux in a retort pouch and thereafter was subjected to a retort treatment under the same condition as that in the above "This Invention B".

(4) Comparative Example 5

The beef round, rehydrated in the above "Comparative Example 2" was, without being cooked, placed together with a curry roux in a retort pouch and thereafter was subjected to the retort treatment under the same condition as that in the above "This Invention B".

(5) Comparative Example 6

The beef round, cooked in the above "Comparative Example 2", was placed together with a curry roux in a retort pouch and thereafter was subjected to the retort treatment under the same condition as that in the above "This Invention B".

The retort curry, which was obtained according to each of the above methods has heat-treated in boiling water for 4 minutes and then a panel of tasters are used to carry out an organoleptic test regarding the taste and texture of the beef round. In the organoleptic test, a 10 pointscoring method was used wherein the best score was 10 and the worst score was 1. Table II shows the results of the above test.

TABLE II

| | Organoleptic Score | Brief Comment |
|---|---|---|
| This Invention B | 10 | Fibrils intact and there was an appropriate resistance to the teeth. Juicy. |
| Comparative Example 3 | 8 | Slightly unpalatable compared with "This Invention B". Slightly lacking in juiciness. |
| Comparative Example 4 | 9 | Relatively good taste and texture but fibrils weaker than in "This Invention B". |
| Comparative Example 5 | 6 | Soft but fibrils weak and resistance to the teeth was bad. Lacking in juiciness. |
| Comparative Example 6 | 8 | Fibrils stronger than those of "Comparative Example 5" and resistance to the teeth was good, but inferior to "This Invention B". | to the method of this invention retains the flavor-bearing materials, such as the meat juices and the like, in a solidified and locked state. Thus, when the dried meat is rehydrated and then cooked, the flavor and texture of the cooked meat are almost the same as those of cooked raw meat. Moreover, this invention also has the advantage that the tissue of the meat is not disintegrated by high temperature and pressure treatment (such as the retort treatment) and thus that the taste and texture of the meat do not become bad. Furthermore, according to this invention, wafer contained in the meat is removed to some degree by the predrying treatment. This invention has, therefore, the advantage that the freeze-drying treatment in this invention can be conducted in a very short time as compared with the freeze-drying time in the prior art and the advantage that it is possible to reduce the damage to the tissue of the meat which is caused by ice crystals formed at the time of the prefreezing before the freeze-drying treatment.

EXAMPLE 1

1000 g of lamb (water content of about 75%) sliced to a thickness of 3 to 5 mm and an area of about 30 to 50 mm×about 50 to 70 mm were placed in an oil tank containing a corn salad oil at 50° C. and then were immersed in oil for 10 minutes to be preheated. Then, the pressure throughout the oil tank was reduced to 10 torr in about one minute and the predrying treatment was carried out by deep-frying the preheated lamb under the reduced pressure for 2 minutes. Thereafter, the oil was drained from the lamb and the pressure in the tank was returned to normal in about 3 minutes and the lamb slices were withdrawn. The resulting lamb slices weighed about 800 g and the water content thereof was about 55%. Then, the lamb slices were prefrozen under a freezing condition of about $-1°$ C./min. until the final temperature of the lamb product reached $-30°$ C., which was followed by a vacuum freeze-drying treatment under 0.5 torr. The heating was carried out on a radiant shelf. The vacuum freeze-drying treatment was carried out at a radiant shelf temperature of 60° C. and in a drying time of 3.5 hours to obtain about 400 g of dried lamb slices having a water content of not more than 3%.

Then, about 400 g of the resulting dried lamb slices were immersed in water of 25° C. for 30 minutes to allow the water to impregnate the meat, whereafter the rehydrated lamb slices weighed about 630 g. Thereafter, the rehydrated lamb was cooked in a butter-greased frying pan to obtain about 500 g of the sauté lamb. The flavor and texture of the sauté lamb were similar to those of raw slices of lamb cooked in a greased-frying pan and seemed to smell somewhat less strongly and to taste better.

EXAMPLE 2

1000 g of minced beef (water content of about 60%) were placed in an oil tank containing a 2 to 1 mixture of corn salad oil and tallow at 50° C. Then, the whole oil tank was reduced in pressure to 5 torr in about one minute. After the pressure reduction was completed, the minced beef was immersed in the oil to be subjected to the predrying treatment by deep-frying it under the reduced pressure for 3 minutes. Thereafter, the oil was drained from the meat, the pressure in the tank was returned to normal in about 3 minutes and the minced beef was withdrawn. The resulting minced beef weighed about 800 g and the water content thereof was about 55%. Thereafter, the prefreezing treatment and the vacuum freeze-drying treatment were carried out according to the same procedure as in Example 1 to obtain about 355 g of dried minced beef having a water content of not more than 3%.

Then, about 355 g of the resultant dried minced beef were immersed in water of 25° C. for 20 minutes to allow the water to impregnate the meat. There was obtained about 770 g of rehydrated beef. The rehydrated minced beef was kneaded in a container, formed into about 3 cm balls and fried in an oil at 170° C. for about 2 minutes to obtain mincemeat balls. The flavor and texture of the obtained mincemeat balls were somewhat similar to those of mincemeat balls made directly from raw minced beef. The former mincemeat balls heated up faster than the latter ones, making them easier to cook.

What is claimed is:

1. A method of drying raw meat containing a meat portion and a fat portion, comprising the steps of:
    deep-frying the raw meat in a tank containing edible oil at a temperature in the range of about 50° to 85° C., under a vacuum, and for about two to about five minutes to obtain predried raw meat having a moisture content of about 35 percent to about 65 percent based on the weight of the meat portion exclusive of the fat portion so that appropriate dehydration and thermal modification occur throughout the meat, whereby flavor-bearing materials of the meat are solidified and locked in, so that growth of ice crystals during vacuum freeze-drying is prevented, and thereafter,
    vacuum freeze-drying the predried raw meat.

2. The method as set forth in claim 1, wherein the vacuum during the deep-frying step is no more than about 100 torr.

3. The method as set forth in claim 1, wherein the vacuum during the deep-frying step is not more than about 50 torr.

4. The method as set forth in claim 1, 2 or 3, wherein the vacuum during the deep-frying step is attained in nor more than about 5 minutes.

5. The method as forth in claim 1, 2 or 3, wherein the vacuum in the oil tank during the deep-frying step is applied before immersing the meat in the oil.

6. The method as set forth in claim 1, 2 or 3, wherein the moisture content in the meat after deep-frying is between about 45 percent to about 55 percent, based on the weight of the meat exclusive of the fat portion.

7. The method as set forth in claim 1, 2 or 3, wherein the vacuum in the oil tank is applied after immersing the meat in the oil.

8. The method as set forth in claim 1, 2 or 3, wherein the vacuum during the deep-frying step is attained in no more than about 2 minutes.

* * * * *